(12) United States Patent
Saiki et al.

(10) Patent No.: US 9,008,861 B2
(45) Date of Patent: Apr. 14, 2015

(54) VEHICLE DEVICE CONTROL SYSTEM WITH A DISABLING FEATURE

(75) Inventors: Takashi Saiki, Okazaki (JP); Ryusuke Ishikawa, Kariya (JP); Takeshi Kumazaki, Okazaki (JP)

(73) Assignee: Denso Corporation, Kariya (JP)

( * ) Notice: Subject to any disclaimer, the term of this patent is extended or adjusted under 35 U.S.C. 154(b) by 358 days.

(21) Appl. No.: 13/343,977

(22) Filed: Jan. 5, 2012

(65) Prior Publication Data

US 2012/0179306 A1  Jul. 12, 2012

(30) Foreign Application Priority Data

Jan. 7, 2011  (JP) ................................. 2011-002318

(51) Int. Cl.
| | |
|---|---|
| *G05D 1/00* | (2006.01) |
| *B60R 25/20* | (2013.01) |
| *B60R 25/00* | (2013.01) |
| *G07C 9/00* | (2006.01) |

(52) U.S. Cl.
CPC ............. *B60R 25/2072* (2013.01); *B60R 25/00* (2013.01); *G07C 9/00309* (2013.01); *G07C 2009/00388* (2013.01); *G07C 2009/00365* (2013.01)

(58) Field of Classification Search
CPC ........ B60R 25/24; B60R 25/01; B60R 25/00; B60R 25/2072; G07C 9/00309; G07C 2009/00365; G07C 2009/00373; G07C 2009/0038; G07C 2009/00388; G07C 2009/00396
USPC .......... 701/2, 32.6, 32.8, 33.1, 33.2, 33.7, 36; 340/5.2, 5.21, 5.61, 5.72, 5.63, 7.32, 340/7.33, 7.34, 7.38, 13.1, 430, 426.13, 340/426.16, 426.28, 426.36, 5.62, 3.1, 3.2, 340/3.21, 4.2, 4.34, 426.17, 539.11, 12.11; 341/176, 177, 178, 182; 455/569.2, 45
See application file for complete search history.

(56) References Cited

U.S. PATENT DOCUMENTS

| | | | | |
|---|---|---|---|---|
| 5,319,364 | A * | 6/1994 | Waraksa et al. | 340/5.64 |
| 5,583,486 | A * | 12/1996 | Kersten | 340/572.1 |
| 6,008,722 | A * | 12/1999 | Hirozawa et al. | 340/426.35 |
| 6,603,388 | B1 * | 8/2003 | Perraud et al. | 340/5.61 |
| 6,700,476 | B1 * | 3/2004 | Okada et al. | 340/5.62 |
| 6,831,547 | B2 * | 12/2004 | Watarai et al. | 340/5.61 |
| 6,850,148 | B2 * | 2/2005 | Masudaya | 340/5.61 |
| 6,924,735 | B2 * | 8/2005 | Ueda et al. | 340/426.28 |

(Continued)

FOREIGN PATENT DOCUMENTS

| | | |
|---|---|---|
| JP | 2000-067586 | 3/2000 |
| JP | 2005-113608 | 4/2005 |

(Continued)

*Primary Examiner* — Thomas G Black
*Assistant Examiner* — Sze-Hon Kong
(74) *Attorney, Agent, or Firm* — Harness, Dickey & Pierce, PLC

(57) ABSTRACT

A vehicle-side unit transmits a first request signal WAKE periodically toward a portable unit, and transmits a second request signal CHLG at every predetermined transmission interval specific to the vehicle-side unit upon reception of a first response signal ACK from the portable unit in response to the transmitted WAKE. The portable unit is operable with power supplied from a battery. The portable unit transmits ACK upon reception of WAKE and becomes ready for reception of CHLG at a timing CHLG is transmitted in accordance with the transmission interval specific to the vehicle-side unit.

11 Claims, 3 Drawing Sheets

(56) References Cited

U.S. PATENT DOCUMENTS

| | | | |
|---|---|---|---|
| 6,980,082 B2* | 12/2005 | Ueda et al. | 340/5.72 |
| 6,996,732 B2* | 2/2006 | Kotlow et al. | 713/324 |
| 7,034,657 B2* | 4/2006 | Ueda et al. | 340/5.62 |
| 7,106,171 B1* | 9/2006 | Burgess | 340/5.72 |
| 7,224,980 B2* | 5/2007 | Hara | 455/456.1 |
| 7,365,633 B2* | 4/2008 | Inoue et al. | 340/5.61 |
| 7,489,231 B2* | 2/2009 | Kadouchi et al. | 340/5.72 |
| 7,551,057 B2* | 6/2009 | King et al. | 340/5.72 |
| 7,751,957 B2* | 7/2010 | Nagaoka et al. | 701/36 |
| 7,778,743 B2* | 8/2010 | Arie et al. | 701/2 |
| 7,907,557 B2* | 3/2011 | Carter | 370/311 |
| 8,044,770 B2* | 10/2011 | Nakajima et al. | 340/5.72 |
| 8,046,080 B2* | 10/2011 | Von Arx et al. | 607/60 |
| 8,193,915 B2* | 6/2012 | McCall et al. | 340/10.34 |
| 8,222,992 B2* | 7/2012 | Nishiguchi et al. | 340/5.63 |
| 8,269,601 B2* | 9/2012 | Burzio | 340/5.6 |
| 8,319,616 B2* | 11/2012 | Girard et al. | 340/426.36 |
| 8,344,850 B2* | 1/2013 | Girard et al. | 340/5.72 |
| 8,532,576 B2* | 9/2013 | Kawamura et al. | 455/63.1 |
| 2004/0075532 A1* | 4/2004 | Ueda et al. | 340/5.72 |
| 2004/0142732 A1* | 7/2004 | Ueda et al. | 455/569.2 |
| 2004/0227656 A1* | 11/2004 | Asakura et al. | 341/176 |
| 2005/0134477 A1* | 6/2005 | Ghabra et al. | 340/825.72 |
| 2005/0162259 A1* | 7/2005 | Hotta et al. | 340/426.13 |
| 2006/0012462 A1* | 1/2006 | Teshima et al. | 340/5.61 |
| 2006/0114100 A1* | 6/2006 | Ghabra et al. | 340/5.61 |
| 2006/0186996 A1 | 8/2006 | Sato | |
| 2006/0202798 A1* | 9/2006 | Baumgartner et al. | 340/5.61 |
| 2006/0255908 A1* | 11/2006 | Gilbert et al. | 340/5.61 |
| 2006/0278700 A1* | 12/2006 | Gotfried et al. | 235/382 |
| 2007/0164876 A1* | 7/2007 | Ostrander et al. | 340/825.72 |
| 2008/0258870 A1* | 10/2008 | Sugiura | 340/7.23 |
| 2009/0091423 A1* | 4/2009 | Nagaoka et al. | 340/5.72 |
| 2011/0153120 A1* | 6/2011 | Katou | 701/2 |

FOREIGN PATENT DOCUMENTS

| | | |
|---|---|---|
| JP | 2006-249719 | 9/2006 |
| JP | 2008-069565 | 3/2008 |
| JP | 2008-144517 | 6/2008 |
| JP | 2009-275427 | 11/2009 |

* cited by examiner

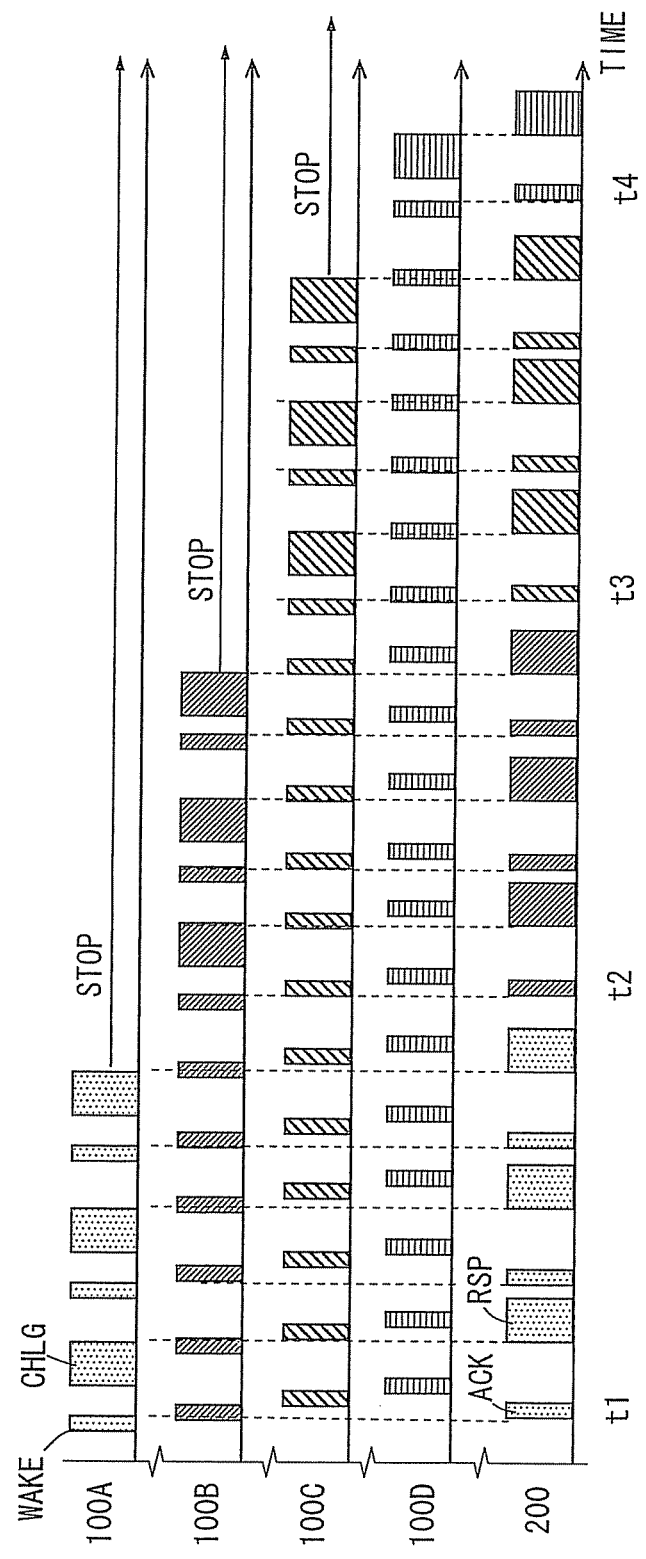

VEHICLE DEVICE CONTROL SYSTEM WITH A DISABLING FEATURE

CROSS REFERENCE TO RELATED APPLICATION

This application is based on and incorporates herein by reference Japanese patent application No. 2011-2318 filed on Jan. 7, 2011.

FIELD OF THE INVENTION

The present invention relates to a vehicle device control system and method, which includes a portable unit carried by a user and a vehicle-side unit mounted in a vehicle for radio communication with the portable unit.

BACKGROUND OF THE INVENTION

A remote lock/unlock control apparatus is disclosed in JP 2005-113608A as one example of a conventional vehicle device remote control system for a vehicle. This vehicle device remote control system is proposed to avoid mutual interference of request signals of a subject vehicle and other vehicle in a case that a portable unit of the subject vehicle is located in a zone, in which an effective transmission zone (referred to also as detection area) of the request signal of the subject vehicle and an effective transmission zone of the request signal of the other vehicle overlap. Specifically, the control apparatus mounted in the vehicle varies a periodic transmission interval Ti of the request signal at each transmission of the request signal.

However, this lock/unlock control apparatus only varies the periodic transmission interval Ti at each transmission of the request signal. The portable unit therefore is likely to continue transmission of a response signal in response to the request signal transmitted from the other vehicle before receiving the request signal transmitted from the subject vehicle. As a result, the portable unit consumes more power because it transmits the response signal unnecessarily.

SUMMARY OF THE INVENTION

It is an object of the present invention to provide a vehicle device control system and method, which suppresses response to a request signal transmitted from a vehicle-side unit of other vehicle and suppresses power consumption in a portable unit.

In a vehicle device control system, a portable unit is carried by a user and a vehicle-side unit is mounted in a vehicle for performing bilateral communications with the portable unit. In each of the bilateral communications, the vehicle-side unit transmits a request signal in a predetermined area around the vehicle and the portable unit transmits a response signal in response to the request signal of the vehicle-side unit. The vehicle-side unit checks up an identification code included in the response signal received from the portable unit with a pre-stored registration code. The vehicle-side unit controls a vehicle device mounted in the vehicle on condition that a checkup result indicates a successful checkup operation.

The vehicle-side unit includes a vehicle-side transmission section, a vehicle-side reception section and a vehicle-side control section. The vehicle-side transmission section transmits the request signal to the portable unit. The vehicle-side reception section receives the response signal from the portable unit. The vehicle-side control section instructs the vehicle-side transmission section to transmit the request signal at a predetermined transmission interval specific to the vehicle side unit, when the response signal is received from the portable unit by the vehicle-side reception section.

The portable unit is operable with power supply from a battery and includes a portable-side reception section, a portable-side transmission section, a portable-side memory section and a portable-side control section. The portable-side reception section receives the request signal from the vehicle-side unit. The portable-side transmission section transmits the response signal to the vehicle-side unit. The portable-side memory section stores the transmission interval in the vehicle-side unit. The portable-side control section instructs the portable-side transmission section to transmit the response signal when the request signal is received by the portable-side reception section, and instructs the portable-side reception section to take a reception state at a timing of next transmission of the request signal in correspondence to the transmission interval stored in the portable-side memory section.

BRIEF DESCRIPTION OF DRAWING

The above and other objects, features and advantages of the present invention will become more apparent from the following detailed description made with reference to the accompanying drawings. In the drawings:

FIG. 4 is a time chart showing an operation of a vehicle device control system according to a comparative example.

DETAILED DESCRIPTION OF EMBODIMENT

Figure 1:
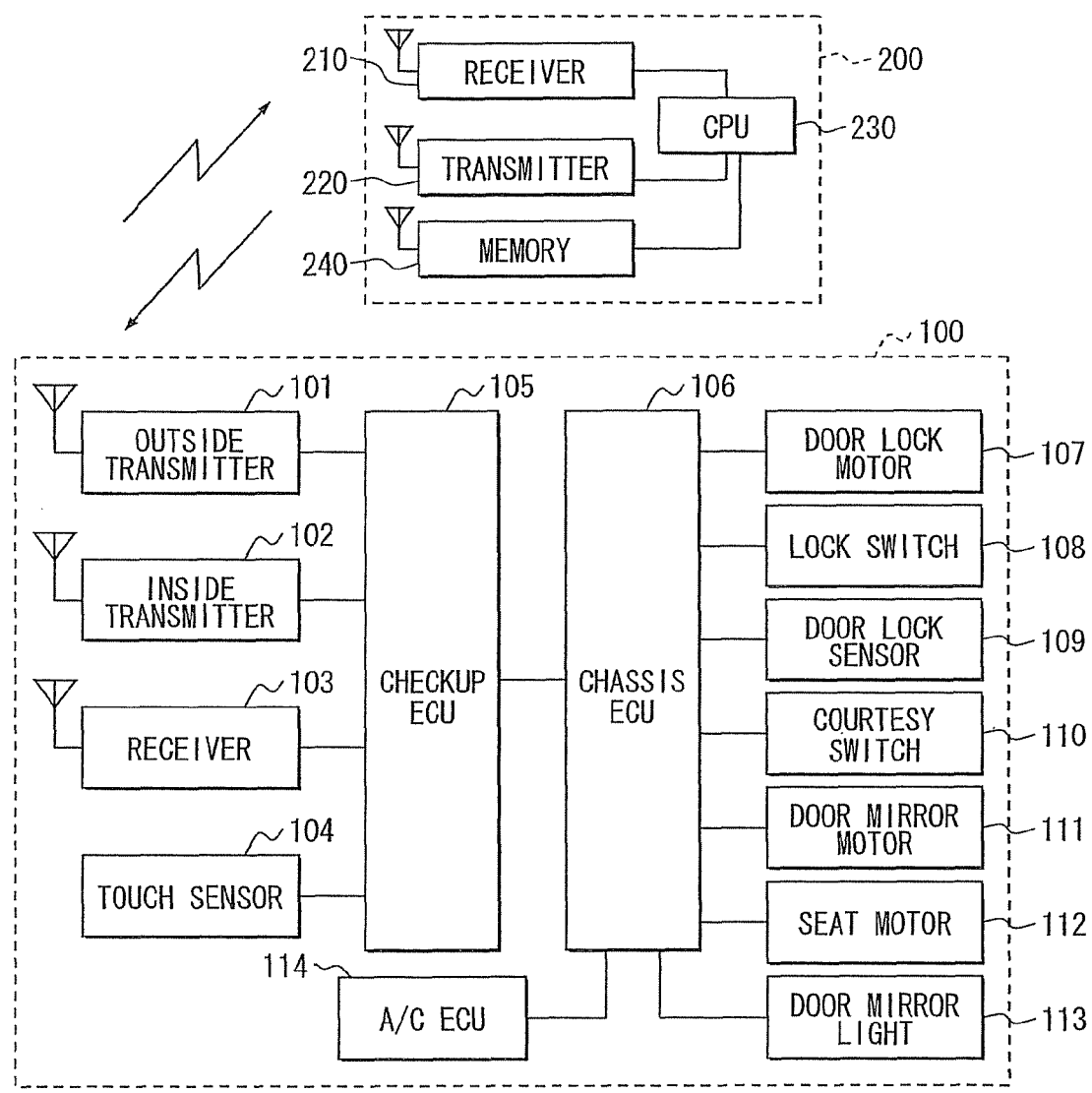
FIG. 1 is a block diagram showing a vehicle device control system according an embodiment of the present invention.

The present invention will be described with reference to an embodiment shown in the drawings.

As shown in FIG. 1, a vehicle device control system includes a vehicle-side unit mounted in a vehicle 100 and a portable unit 200 carried by a user. The vehicle device control system performs plural bilateral communications (more specifically, cipher communications), in each of which the vehicle-side unit transmits a request signal in a predetermined zone around the vehicle 100 and the portable unit 200 transmits a response signal in response to the request signal. The vehicle-side unit checks up an identification code included in the response signal received from the portable unit 200 in comparison with a pre-stored registration code. The vehicle device control system controls the vehicle device on condition that a checkup result indicates a successful checkup (checkup OK).

The vehicle-side unit and the vehicle device are mounted on the vehicle 100. Specifically, the vehicle 100 is mounted with an outside transmitter circuit 101, an inside transmitter circuit 102, a receiver circuit 103, a touch sensor 104, a checkup ECU (electronic control unit) 105, a chassis ECU 106, a door lock motor 107, a lock switch 108, a door lock position sensor 109, a courtesy switch 110, a door mirror motor (side mirror motor) 111, a seat motor 112, a door mirror light 113, an air-conditioner ECU 114 and the like.

The vehicle-side unit is operable with power supplied from an in-vehicle battery (not shown) and includes the outside transmitter circuit 101, the receiver circuit 103, the checkup ECU 105, the chassis ECU 106 and the like. The vehicle device includes the door lock motor 107, the door mirror motor 111, the seat motor 112, the door mirror light 113, the air-conditioner ECU 114 and the like. Although the door lock motor 107, the door mirror motor 111, the seat motor 112, the door mirror light 113 and the air-conditioner ECU 114 are referred to as the vehicle device, the vehicle device may be only one of them. As will be described later, other vehicle devices such as a car audio system (car stereo set) may also be included as the vehicle device.

This vehicle device is configured to perform a welcome function. The welcome function is a function, in which a vehicle welcomes a user before boarding into the vehicle. For example, the welcome function includes a function of assisting a user in using a vehicle or a function of entertaining a user to please the user.

The outside transmitter circuit 101 is attached to each door of the vehicle 100. The inside transmitter circuit 102 is provided in the vehicle compartment. The outside transmitter circuit 101 and the inside transmitter circuit 102 transmits respective request signals in response to transmission command signals of the checkup ECU 105. For example, the outside transmitter circuit 101 and the inside transmitter circuit 102, which have respective LF (low frequency) antennas (not shown), transmit the request signals in the form of radio waves in the LF band (for example, about 134 kHz) toward the portable unit 200. The bilateral communication of the outside transmitter circuit 101 with the portable unit 200 will be described in detail later.

The request signal of the outside transmitter circuit 101 is set to be reachable about several meters. When the vehicle 100 is parked with its each door being locked, the detection area is formed around each door of the vehicle 100 in correspondence to the distance of reach of the request signal at every predetermined interval. Thus, it is possible to detect that a user carrying the portable unit 200 moved away from the vehicle 100 or approached the vehicle 100. That is, the outside transmitter circuit 101 transmits the request signal at every predetermined interval of time.

In case of locking or unlocking the vehicle door by the bilateral communication between the portable unit 200 and the vehicle-side unit, it is sufficient that the request signal of the outside transmitter circuit 101 has the reachable distance of, for example, 0.8 to 1.5 meters. However, in this embodiment, the reachable distance is set to several meters to perform the welcome function. The welcome function may also perform air temperature regulation of the air-conditioner. Therefore, in case that the reachable distance of the request signal is about 1 meter, the welcome function may not provide satisfactory advantage. It is preferred to set the reachable distance of the request signal of the outside transmitter circuit 101 to several meters in the vehicle device control system as in the present embodiment.

The detection area of the inside transmitter circuit 102 is set to cover a vehicle compartment to detect whether the portable unit 200 is inside the vehicle compartment. The detection area of the inside transmitter circuit 102 may be formed of detection areas, which are provided by a front-seat compartment transmitter, a rear-seat compartment transmitter and a luggage compartment transmitter. The front-seat compartment transmitter, the rear-seat compartment transmitter and the luggage compartment transmitter provide the detection areas, which primarily cover a front-seat space, a rear-seat space and a luggage space such as a trunk space, respectively. In this case, the detection areas formed by the front-seat compartment transmitter, the rear-seat compartment transmitter and the luggage compartment transmitter jointly cover the whole compartment space.

The receiver circuit 103 is provided in the vehicle compartment of the vehicle 100 and receives the response signal transmitted from the portable unit 200. That is, the receiver circuit 103 receives by its UHF antenna the response signal, which is transmitted from the portable unit 200 as a radio wave in a UHF band (for example, 300 MHz to 3 GHz). The response signal received by the receiver circuit 103 is outputted to the checkup ECU 105.

Each of the checkup ECU 105 and the chassis ECU 106 is formed as a computer, which includes a CPU, a memory circuit (for example RAM (DRAM, SRAM, etc.) a ROM (EPROM, EEPROM, etc.), I/O and a bus line connecting those components. In the checkup ECU 105 and the chassis ECU 106, the CPU executes various operation processing and performs respective controls as described later by executing programs stored in the ROM while using temporary storage function of the RAM.

The checkup ECU 105 stores a predetermined value indicating the transmission interval of the request signal in its memory circuit. This transmission interval is an interval from the last transmission of the request signal to the next transmission of the same, in case that the response signal transmitted from the portable unit 200 is received. This transmission interval is set to a value specific to the vehicle-side unit. Further, this transmission interval is set by the checkup ECU 105.

Specifically, the checkup ECU 105 detects that the user exited the vehicle (exiting detection section). For example, it is detected that the user exited the vehicle in response to signals of seat sensors (not shown) provided at plural seats in the vehicle, if all of the seat sensors stopped outputting detection results, which indicate seating of the user. The checkup ECU 105 further acquires exiting time from a clock (not shown) provided in its inside or outside (exiting time acquisition section). The exiting time indicates time, at which the user is detected as having exited the vehicle. That is, the chassis ECU 106 acquires the time from the clock as the exiting time when it is detected that the user exited the vehicle. The checkup ECU 105 temporarily stores this exiting time in the RAM or the like. The checkup ECU 105 sets the transmission interval in correspondence to the acquired exiting time (setting section). For example, the transmission interval is set in correspondence to the exiting time by, for example, multiplying the exiting time by a predetermined constant. The vehicle device control system according to the present embodiment also needs the transmission interval. The checkup ECU 105 therefore transmits the set transmission interval to the portable unit 200 (setting section). The checkup ECU 105 transmits this transmission interval to the portable unit 200, when the result of checkup performed by the bilateral communication with the portable unit 200 indicates successful checkup (checkup OK) representing that the portable unit 200 is an authorized one for a subject vehicle. This checkup is performed, for example, when the user exited. The seat sensor may be provided on only a driver's seat or all of the seats.

In case of plural vehicles, users exiting respective vehicles at different times in most cases. Therefore, by setting the transmission interval in correspondence to the exiting time, it is possible to set the transmission interval to a different value from that of the vehicle-side unit mounted in the other vehicle. Since the set transmission interval is transmitted to the portable unit 200, the portable unit 200 acknowledges this transmission interval.

The checkup ECU 105 may set the transmission interval in correspondence to the exiting time and predetermined information specific to each vehicle (for example, chassis number, vehicle ID assigned to each vehicle), on which the vehicle-side unit is mounted. The predetermined information is not the same as that of the other vehicle either. By thus setting the transmission interval in accordance with the exiting time and the predetermined information, it is further reduced that the transmission interval becomes by chance the same as that of the vehicle-side unit of the other vehicle.

The transmission interval is set by, for example, the checkup ECU 105. The transmission interval may be set at a dealer shop or a manufacturing plant. That is, a value indicating a transmission interval may be written into the memory circuit of the checkup ECU 105 at the time of manufacture. In this instance, the checkup ECU 105 sets the transmission interval in correspondence to predetermined information specific to each vehicle (for example, chassis number, vehicle ID assigned to each vehicle), on which the checkup ECU 105 is mounted. The vehicle-specific information such as the chassis number does not become the same as that of the other vehicle. Thus, it is possible to set a specific transmission interval, which is different from that of a vehicle-side unit mounted on the other vehicle.

Any transmission interval may be adopted as far as it is a specific value different from that of the vehicle-side unit mounted on the other vehicle. The transmission interval may therefore be set based on time, at which the user performed a predetermined operation on the vehicle, other than the exiting time of the user from the vehicle. In most cases, users of plural vehicles perform respective operations at different times. It is thus possible to set the transmission interval, which is different from that of the vehicle-side unit mounted in the other vehicle, by setting the transmission interval based on the time, at which the user performed on the predetermined operation on the vehicle.

Even in this case, the portable unit 200 can acknowledge this transmission interval by transmitting the set transmission interval to the portable unit 200 from the vehicle-side unit of the vehicle 100. The predetermined operation, which the user performs on the vehicle, may include boarding into the vehicle or manipulation on a vehicle device (air-conditioner or navigation apparatus, not shown) or an ignition switch (not shown) in addition to exiting from the vehicle.

Thus, times at which users board respective vehicles differ from vehicle to vehicle. Further, times, at which users turn on or off the air-conditioner or regulate air temperature (that is, manipulation timing of on/off, temperature regulation) in the respective vehicles, differ among plural vehicles. Further, times, at which users turn on or off the navigation apparatus or set destinations (that is, manipulation timing of on/off, destination setting) in the respective vehicles, differ among plural vehicles. Further, times, at which users turn the ignition switch from IG (ignition) OFF to ACC (accessory) or from OFF to IG-ON (that is, manipulation timing of switching from IG-OFF to ACC or from OFF to IG-ON) in the respective vehicles, differ among plural vehicles. That is, the times of transition of power supply caused by users' manipulation on the ignition switch differ among plural vehicles.

Specifically, the checkup ECU 105 (operation detection section, manipulation detection section) detects that the user performed the predetermined operation.

For example, the checkup ECU 105 (boarding detection section) detects that the user performed the predetermined operation (user boarded the vehicle), when a signal is outputted (that is, this signal is acquired) from any one of the seat sensors indicating a detection result that the user is seated based on signals from seat sensors (not shown) provided on plural seats in the vehicle. The seat sensor may be provided on only a driver's seat or on all the seats.

The checkup ECU 105 (manipulation detection section) detects that the user performed the predetermined operation (manipulation) on the vehicle (vehicle device), when a signal is outputted (that is, this signal is acquired) from the vehicle device (air-conditioner ECU 114, car navigation apparatus) indicating that the user performed the manipulation. In this case, when the user performs the above-described manipulation on the vehicle device (air-conditioner ECU 114, car navigation apparatus and the like), the vehicle device outputs to the checkup ECU 105 a signal indicating that the user performed the manipulation.

When the transition of the power supply is made by the user's manipulation on the ignition switch, the checkup ECU 105 (manipulation detection section) detects that the user performed the predetermined operation (manipulation) on the ignition switch (vehicle device).

The checkup ECU 105 (operation time acquisition section, boarding time acquisition section, manipulation time acquisition section) acquires from a clock (not shown) provided in its inside or outside the operation time, at which it is detected that the user performed the predetermined operation (manipulation) on the vehicle (vehicle device). That is, the checkup ECU 105 acquires the operation time (boarding time, manipulation time) from the clock when it is detected that the user performed the predetermined operation (manipulation) on the vehicle (vehicle device). The checkup ECU 105 temporarily stores this operation time (boarding time, operation time) in the RAM. The checkup ECU 105 (setting section) sets the transmission interval in correspondence to the acquired operation time (boarding time, manipulation time). For example, the transmission interval is set based on the operation time (boarding time, manipulation time) by multiplying the operation time (boarding time, manipulation time) by a predetermined constant.

The manipulation on the vehicle device may be repeated plural times when the user boards the vehicle. It is therefore possible to adopt the time, at which the user manipulated the vehicle device first time after boarding the vehicle, and set the transmission interval in correspondence to such time.

The checkup ECU 105 checks whether the identification code included in the response signal received by the receiver circuit 103 satisfies a predetermined relation such as agreement with the pre-stored code, thereby to check up whether the portable unit 200 is an authorized one, that is, whether the 200 is for the subject vehicle. When the checkup result indicates that the predetermined relation is satisfied (checkup OK), the checkup ECU 105 outputs a control signal to the chassis ECU 106 thereby to control the vehicle device such as the door lock motor 107, the door mirror motor 111, the seat motor 112, the door mirror light 113, the air-conditioner ECU 114 and the like. This registration code is pre-stored in the memory circuit in the checkup ECU 105.

When the control signal is inputted from the checkup ECU 105, the chassis ECU 106 drives and controls the vehicle device by outputting the control signal (drive signal) to the vehicle device such as the door lock motor 107 (vehicle door lock section), the door mirror motor 111, the seat motor 112, the door mirror light 113, the air-conditioner ECU 114 and the like.

A door handle provided on each door of the vehicle operates as an antenna of the outside transmitter circuit 101. The touch sensor 104 is provided on the door handle. The touch sensor 104 detects that a holder (user) of the portable unit 200 touched the door handle and manipulated the door handle.

When the user touched, the touch sensor 104 outputs a detection result indicating the touch. The lock switch 108, which is formed as a push switch, is also provided on the door handle.

When a drive signal (lock signal or unlock signal) is transmitted from the chassis ECU 106, the door lock motor 107 (vehicle door lock section) locks and unlocks each vehicle door by driving the same in the forward direction and the reverse direction in response to the lock signal and the unlock signal, respectively.

The door lock position sensor 109 (lock condition detection section) detects a door lock condition of the vehicle door. That is, the door lock position sensor 109 detects whether the vehicle door is locked or unlocked and outputs its detection result to the chassis ECU 106. The chassis ECU 106 outputs the detection result to the checkup ECU 105.

The courtesy switch 110 detects whether the vehicle door is closed or open and outputs its detection result to the chassis ECU 106. The chassis ECU 106 outputs this detection result to the checkup ECU 105.

The door mirror motor 111 rotates an outside rear view mirror (door mirror or side mirror) provided outside the vehicle 100. The door mirror motor 111 rotates the door mirror in response to the control signal (drive signal) outputted from the chassis ECU 106 from the stowed position of the door mirror (for example, door mirror position (angle) of the vehicle 100) to the deployed position (that is, a predetermined rear view recognition position, for example, door mirror position (angle) when the vehicle is traveling), or from the deployed position (deployed angle) to the stowed position (stowed angle).

This predetermined rear view recognition position indicates a door mirror position (angle), which the user prefers. The amount of rotation of the door mirror motor 111 from the stowed position to the predetermined rear view recognition position or from the predetermined rear view recognition position to the stowed position is present in correspondence to the door mirror position, which is to the driver's preference. The chassis ECU 106 pre-stores in its memory circuit such as a memory (not shown) a value, which indicates a rotation amount. The chassis ECU 106 controls in correspondence to a value indicating the rotation amount in controlling the door mirror motor 111.

The chassis ECU 106 may rotate (drive and control) the door mirror motor 111 to change the door mirror from the deployed position to the stowed position or from the stowed position to the deployed position even in cases the control signal is not applied from the checkup ECU 105. For example, the door mirror motor 111 may be driven to automatically rotate the door mirror from the deployed position to the stowed position when the door lock condition is detected by the door lock position sensor 109. Further, the door mirror motor 111 may be driven to automatically rotate the door mirror from the stowed position to the deployed position when the door unlock condition is detected by the door lock position sensor 109. The door mirror motor 111 may be driven to rotate the door mirror from the deployed position to the stowed position in correspondence to the ACC-OFF condition, and to rotate the door mirror from the stowed position to the deployed position in correspondence to the ACC-ON condition.

The seat motor 112 is provided to slide (move) the seat (for example, seat for a driver) provided in the compartment of the vehicle 100 in the forward-rearward direction. Specifically, the seat is configured to be slidable in the forward-rearward direction within a predetermined slidable range on slide rails fixed to the floor of the vehicle 100.

The seat motor 112 slides (moves) the seat to the position, which the user prefers, in response to the control signal (drive signal) from the chassis ECU 106. The amount of rotation of the seat motor 112 for sliding the seat to the position, which the user prefers, is preset in accordance with the user's preference. The chassis ECU 106 pre-stores a value indicating the rotation amount in the memory circuit such as a memory (not shown). The chassis ECU 106 controls the seat motor 112 in driving and controlling the same in accordance with the value indicating the rotation amount. The sliding of the seat in the forward-rearward direction is performed electrically in response to the control signal from the chassis ECU 106.

It is possible that the chassis ECU 106 may rotate (drives and controls) the seat motor 112 to slide the seat in addition to a case that the control signal is inputted from the checkup ECU 105. For example, the chassis ECU 106 may rotate (drive and control) the seat motor 112 in response to the control signal from a seat slide switch (not shown), which is provided in the compartment and manipulated by the user. The chassis ECU 106 continuously rotates (drives and controls) the seat motor 112, while the control signal is being applied from the seat slide switch (not shown). The door mirror light 113 is provided in the vehicle outside rear-view mirror (door mirror or side mirror) of the vehicle 100. The door mirror light 113 is turned on in response to the control signal of the chassis ECU 106. The lighting condition (color, periodic lighting period and the like) of the door mirror light 113 can be preset (for example, selected from plural lighting conditions) in accordance with a user's preference. The chassis ECU 106 pre-stores a value indicating this lighting condition in the memory circuit such as a memory (not shown). The chassis ECU 106 controls the door mirror light 113 in accordance with the value indicating this lighting condition in controlling the door mirror light 113.

The door mirror light 113 is used as an example of a lighting device. The lighting device may be front lights, a compartment interior light, turn direction indicator lights. It is possible to preset a specific lighting device (one or plural) or a combination of plural lighting devices to be turned on based on user's preference.

The air-conditioner ECU 114 (air-conditioner control apparatus) regulates air-conditioned environment in the compartment of the vehicle 100. The air-conditioner ECU 114 operates in response to the control signal of the chassis ECU 106. The air-conditioned environment (start, operation period temperature, flow amount and the like) may be preset to the user's preference. The chassis ECU 106 pre-stores a value indicating this air-conditioned environment in the memory circuit such as a memory (not shown). The chassis ECU 106 performs this control in accordance with the value indicating the air-conditioned environment in driving and controlling the air-conditioner ECU 114.

As the vehicle device, a car audio system (car stereo set), a sound generator (horn, buzzer) and the like may be used. The car audio system and the generator reproduce music in accordance with a control signal according to the chassis ECU 106. The reproduction condition (specific music or volume to be reproduced) of the car audio system and the sound generator may be preset in accordance with the user's preference. A value indicating this reproduction condition may be pre-stored in the memory circuit such as a memory (not shown). The chassis ECU 106 performs control in accordance with the value indicating the reproduction condition in driving and controlling the car audio system and the sound generator.

The portable unit 200 will be described next. The portable unit 200 includes therein a battery (not shown) and is operable with power supply form this battery. The portable unit 200 includes, as shown in FIG. 1, a receiver circuit 210, a transmitter circuit 220, a CPU 230, a memory circuit 240 and the like. The receiver circuit 210 receives request signals transmitted from the outside transmitter circuit 101 and the inside transmitter circuit 102 of the vehicle-side unit. For example, the receiver circuit 210 includes a LF antenna and receives through the LF antenna by the request signals transmitted from the transmitter circuit 101 and the inside transmitter circuit 102 as radio waves in a LF band (for example, 30 to 300 kHz).

The transmitter circuit 220 transmits a signal (response signal) to the receiver circuit 103 of the vehicle 100. For example, the transmitter circuit 220 has a UHF (ultra high frequency) antenna and transmits through the response signal to the receiver circuit 103 of the vehicle 100 as a radio wave in a UHF band (300 MHz to 3 GHz).

The CPU performs various operation processing by executing programs stored in the memory circuit 240. It instructs the section to take a reception state (state for receiving request signal (Challenge referred to as CHLG)) at a predetermined interval (interval after transmission of a response signal of acknowledgement (ACK)). It also instructs the transmitter circuit 220 to transmit the response signal. The memory circuit 240 stores therein the programs, which are executed by the CPU 230, the transmission interval (value indicating the transmission interval) of the vehicle-side unit, the identification code and the like.

The CPU 230 instructs the receiver circuit 210 to take the reception state at a timing of the next transmission of the request signal (CHLG) in accordance with the transmission interval stored in the memory circuit 240. In this instance, the CPU 230 instructs to take the reception state at a time (TDx seconds in FIG. 2), which is determined by subtracting from the transmission interval (TD seconds in FIG. 2) a processing time that is taken from reception of the request signal (WAKE) to the transmission of the response signal (ACK). Therefore, the memory circuit 240 may store therein a time (value indicating this time) as the transmission interval, which corresponds to the processing time from the reception of the request signal (WAKE) to the transmission of the response signal (WAKE).

Figure 2:
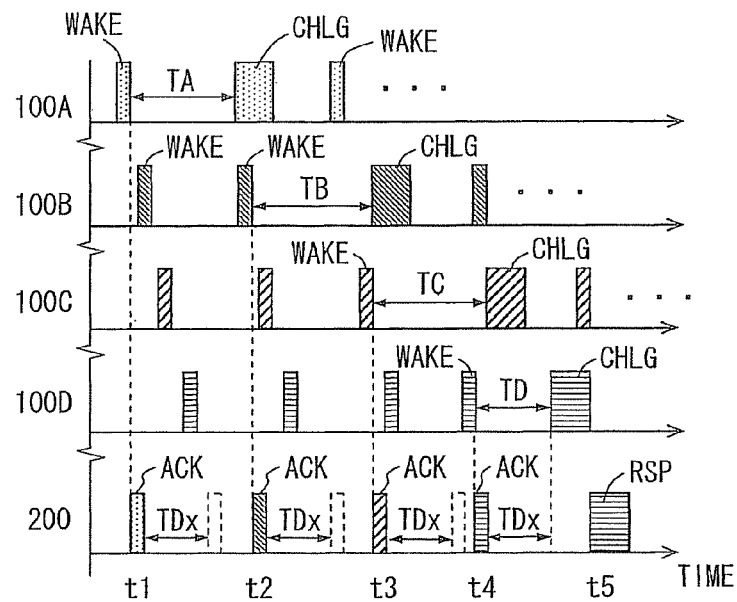
FIG. 2 is a time chart showing an operation of the vehicle device control system according to the embodiment of the present invention.
Figure 3:
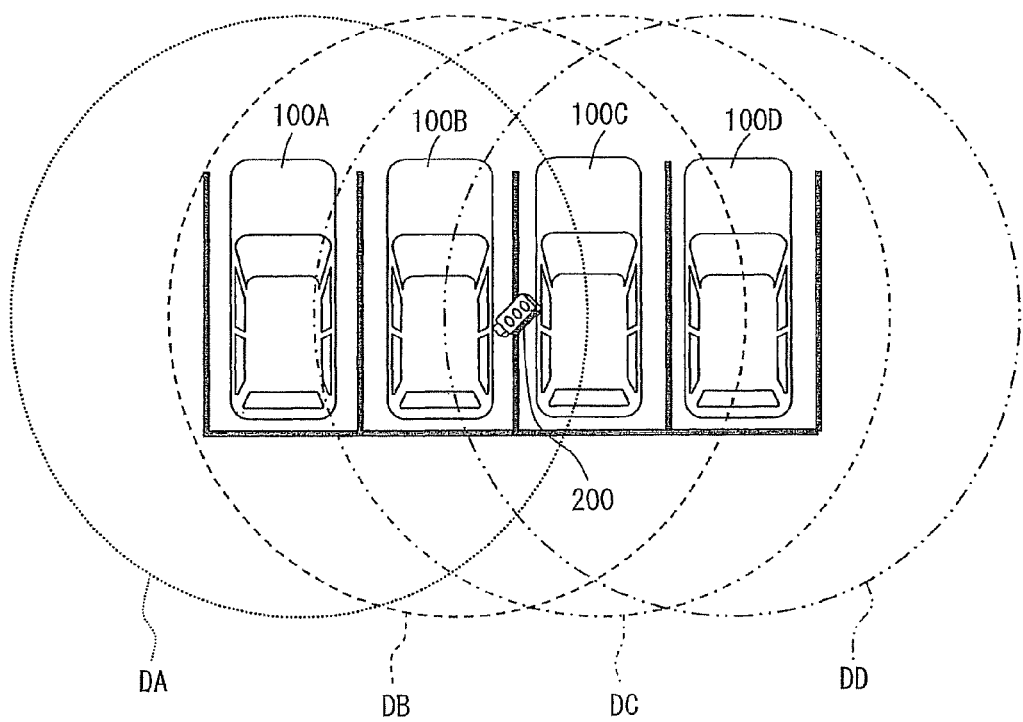
FIG. 3 is a schematic view showing a case, in which plural vehicles mounting respective vehicle device control systems according to the embodiment of the present invention are parked in parallel.

A processing operation of the vehicle device control system will be described with reference to FIGS. 2 and 3. It is assumed as an example that a vehicle 100A to a vehicle 100D, in each of which the same vehicle device control system is mounted, are parked side by side, and the detection areas DA to DD of the respective vehicles 100A to 100D overlap as shown in FIG. 3. As shown in FIG. 2, the transmission intervals of the vehicle-side units mounted in the vehicles 100A to 100D (specific values to the vehicle-side units) are TA to TD, respectively. The portable unit 200 is a portable unit provided specifically or exclusively to the vehicle 100D. In FIG. 2, a signal of narrow width pulse shape and a signal of wide width pulse shape among signals transmitted from the vehicles 100A to 100D indicate WAKE and CHLG (challenge), which are a first request signal and a second request signal, respectively. On the other hand, a signal of narrow width pulse shape and a signal of wide width pulse shape among signals transmitted from the portable unit 200 indicate ACK and RSP (response), which are a first response signal and a second response signal, respectively.

As far as the reachable distance of the request signal of the outside transmitter circuit 101 is about 1 meter, it is possible that only two detection areas of the vehicle-side units mounted on two vehicles parked adjacently overlap. However, if the reachable distance of the request signal is above several meters as in the present embodiment, it is possible that the detection areas of the vehicle-side units mounted on four vehicles (that is, at least three vehicles) parked adjacently overlap.

First, as shown in FIG. 2, the vehicle-side unit (vehicle-side transmission section) in each vehicle 100A to 100D transmits a WAKE (wakeup signal, activation request signal), which requests activation of the portable unit 200 (CPU 230), at every predetermined interval from the outside transmitter circuit 101. The checkup ECU 105 (vehicle-side control section) instructs the outside transmitter circuit 101 to transmit the WAKE at the predetermined interval. Thus, the outside transmitter circuit 101 (vehicle-side transmission section) in each vehicle 100A to 100D transmits the WAKE at every predetermined interval in response to the transmission instruction signal from the checkup ECU 105.

The vehicle-side unit in each vehicle 100A to 100D continues to transmit the WAKE at the same interval until it receives the response signal (ACK) once. However, the checkup ECU 105 instructs transmission of WAKE at every predetermined interval when the vehicle is parked and all the vehicle doors are locked. Therefore, the timing of transmitting the first WAKE differs among vehicles 100A to 100D. In the example of FIG. 2, the WAKE is transmitted from the vehicle-side unit (outside transmitter circuit 101) in the order from the vehicle 100A, the vehicle 100B, the vehicle 100C and the vehicle 100D.

The portable unit 200 (portable-side control section) is in a sleep state, in which the CPU 230 is in a low power consumption mode to reduce battery power consumption normally (waiting for reception of WAKE, that is, not performing bilateral communication with the vehicle-side unit, that is, until receiving the WAKE from the vehicle-side unit and starting the bilateral communication). The CPU 230 (portable-side reception section, portable-side control section) wakes up (activated) and changes its state to an active state when the WAKE is received in the sleep state.

The CPU 230 (portable-side reception section, portable-side control section) instructs the transmitter circuit 220 to transmit the response signal (ACK, activation response signal) indicating activation as the response signal when the WAKE is received by the receiver circuit 210. Thus, the transmitter circuit 220 (portable-side transmission section) transmits the ACK.

When the WAKE is received by the receiver circuit 210, the CPU 230 (portable-side control section) instructs the receiver circuit 210 to take the reception state at the timing of transmission of the request signal (CHLG) in accordance with the transmission interval stored in the memory circuit 240 (portable-side memory section). Thus, the receiver circuit 210 (portable-side reception section) takes the reception state at the timing of transmission of the request signal and receives only the request signal transmitted at this timing.

For example, as shown at timing t1 in FIG. 2, when the WAKE is transmitted only from the vehicle-side unit (outside transmitter circuit 101) of the vehicle 100A, the portable unit 200 transmits the ACK in response to the WAKE transmitted from the vehicle-side unit (outside transmitter circuit 101) of the vehicle 100A and takes the reception state after a period of TDx seconds from the transmission of the ACK. During the period of TDx from the transmission of the ACK, the WAKE and the CHLG cannot be received.

Similarly, as shown at timing t2 in FIG. 2, when the WAKE is transmitted only from the vehicle-side unit (outside transmitter circuit 101) of the vehicle 100B, the portable unit 200 transmits the ACK in response to the WAKE transmitted from the vehicle-side unit (outside transmitter circuit 101) of the vehicle 100B and takes the reception state after a period of TDx after the transmission of the ACK. During the period of TDx from the transmission of the ACK, the WAKE and the CHLG cannot be received.

Similarly, as shown at timing t3 in FIG. 2, when the WAKE is transmitted only from the vehicle-side unit (outside transmitter circuit 101) of the vehicle 100C, the portable unit 200 transmits the ACK in response to the WAKE transmitted from the vehicle-side unit (outside transmitter circuit 101) of the vehicle 100C and takes the reception state after TDx from the transmission of the ACK. During the period of TDx from the transmission of the ACK, the WAKE and the CHLG cannot be received.

Similarly, as shown at timing t4 in FIG. 2, when the WAKE is transmitted only from the vehicle-side unit (outside transmitter circuit 101) of the vehicle 100D, the portable unit 200 transmits the ACK in response to the WAKE transmitted from the vehicle-side unit (outside transmitter circuit 101) of the vehicle 100D and takes the reception state after TDx after the transmission of the ACK. During the period of TDx from the transmission of the ACK, the WAKE and the CHLG cannot be received.

On the other hand, the vehicle-side unit (vehicle-side transmission section), which received the ACK from the portable unit 200, as shown in FIG. 2, transmits the CHLG (identification code request signal) from the outside transmitter circuit 101 the transmission interval specific to the vehicle-side unit. The CHLG is transmitted as the request signal to request transmission of the response signal including the identification code. The checkup ECU 105 (vehicle-side control section) instructs the outside transmitter circuit 101 to transmit the CHLG at the transmission interval specific to the vehicle-side unit. The outside transmitter circuit 101 (vehicle-side transmission section) in the vehicle-side unit, which received the ACK, transmits the CHLG at the transmission interval in response to the transmission instruction signal from the checkup ECU 105.

For example, in FIG. 2, when the ACK transmitted from the portable unit 200 in response to the WAKE transmitted at timing t1 is receive, the vehicle 100A transmits the CHLG after the transmission interval TA from the transmission of WAKE.

Similarly, in FIG. 2, when the ACK transmitted from the portable unit 200 in response to the WAKE transmitted at timing t2 is received, the vehicle 100B transmits the CHLG after the transmission interval TB from the transmission of WAKE.

Similarly, in FIG. 2, the ACK transmitted from the portable unit 200 in response to the WAKE transmitted at timing t3 is received, the vehicle 100C transmits the CHLG after the transmission interval TC from the transmission of WAKE.

Similarly, in FIG. 2, the ACK transmitted from the portable unit 200 in response to the WAKE transmitted at timing t4 is received, the vehicle 100D transmits the CHLG after the transmission interval TD [s] from the transmission of WAKE.

The transmission intervals TA to TD are set specifically to the vehicle-side units of the vehicles 100A to 100D and used as the interval from the transmission of the WAKE to the transmission of the CHLG. As far as the transmission interval is specific to the vehicle-side unit, any interval may be adopted. It may be an interval from the reception of the ACK to the transmission of the CHLG.

When the CPU 230 of the portable unit 200 of the portable unit 200 receives the CHLG by the receiver circuit 210 after TDx from the transmission of the ACK, the portable unit 200 transmits a RSP (response signal including the identification code) in response to the CHLG. That is, the CPU 230 (portable-side control section) instructs the transmitter circuit 220 to transmit the RSP. The transmitter circuit 220 (portable unit side transmission section) thus transmits the RSP. For example, in the example of FIG. 2, it is only the CHLG transmitted from the vehicle 100D, that is transmitted after the period TDx from timing t4 and hence can be received by the portable unit 200. When the CHLG is thus received by the receiver circuit 210, the CPU 230 of the portable unit 200 responsively transmits the RSP at timing t5.

As described above, when the vehicle-side unit transmits the WAKE towards the portable unit 200 at the predetermined interval and receives the ACK from the portable unit 200 in response to the WAKE, the vehicle-side unit transmits the CHLG at the predetermined transmission period, which is specific to the vehicle-side unit. The portable unit 200 becomes operable with the power supply from the battery. When the WAKE is received, the portable unit 200 transmits the ACK and takes the reception state for the CHLG at the timing of the transmission of CHLG in accordance with the transmission interval specific to the vehicle-side unit. That is, the portable unit 200 can receive the CHLG and transmit the RSP only at a timing, at which the vehicle-side unit transmits the CHLG and the portable unit 200 receives the CHLG.

By way of the bilateral communication between the vehicle-side unit and the portable unit 200, the vehicle-side unit can acquire the identification code of the portable unit 200, which became a communication counterpart. The checkup ECU 105 (checkup section) checks up whether a predetermined relation is satisfied, that is, whether the checkup result indicates the checkup OK. The predetermined relation may be, for example, agreement between the identification code included in the RSP transmitted from the portable unit 200 and the pre-stored code.

The checkup ECU 105 outputs a control signal to the chassis ECU 106 to control the vehicle device when the checkup result (checkup OK) indicating the attainment of the predetermined relation. The chassis ECU 106 drives and controls the vehicle device in accordance with the control signal when the control signal is inputted from the checkup ECU 105.

For example, when the checkup result indicating the checkup OK is provided under the condition that the vehicle door is closed and locked, the checkup ECU 105 supplies electric current to the sensor 104 mounted in the door handle of each vehicle door so that the sensor 104 may detect manipulation of the door handle by the user. When the manipulation of the user is detected by the sensor 104, the checkup ECU 105 outputs an unlock instruction to the door lock motor 107 (vehicle door lock section) through the chassis ECU 106 to unlock each vehicle door.

When it is detected that the user manipulated the lock switch 108 (described later) under the condition that the checkup result indicating the checkup OK is produced with the vehicle door being not locked, the checkup ECU 105 (vehicle door lock control section) outputs the lock instruction to the door lock motor 107 through the chassis ECU 106 to lock each vehicle door.

The chassis ECU 106 outputs, for example, a drive signal (lock signal, unlock signal) for controlling the lock/unlock state of each vehicle door to the door lock motor 107 mounted in each vehicle door. When the lock signal or the unlock signal is transmitted from the chassis ECU 106, the door lock motor 107 locks or unlocks each vehicle door by rotating in the forward direction or the reverse direction in response to the lock signal or the unlock signal.

Thus, the vehicle door is unlocked by the bilateral communication between the portable unit 200 and the vehicle-side unit.

If the door mirror motor 111 is used as the vehicle device, the checkup ECU 105 drives and controls the door mirror motor 111 to rotate the door mirror when the checkup result indicating the checkup OK is produced. Specifically, when the checkup result indicating the checkup OK, the checkup ECU 105 outputs to the checkup ECU 105 a control signal instructing rotation of the door mirror from the stowed position to the deployed position. When this control signal is inputted, the chassis ECU 106 outputs the control signal (drive signal) to the door mirror motor 111 in correspondence to the inputted control signal thereby to drive and control the door mirror motor 111 from the stowed position of the door mirror to the deployed position.

Thus, when an authorized user carrying the portable unit 200 approaches the vehicle 100, the door mirror of the vehicle can be rotated (that is, rotated from the stowed position to the deployed position). That is, the vehicle can perform the function of welcoming the authorized user, who carries the authorized portable unit.

In case that the seat motor 112 is used as the vehicle device, the checkup ECU 105 drives and controls the seat motor 112 to move the seat in response to the checkup result indicating the checkup OK. More specifically, when the checkup result indicating the checkup OK, the checkup ECU 105 outputs to the chassis ECU 106 a control signal instructing sliding of the seat to the predetermined position (preferred position of the authorized user). When this control signal is inputted, the chassis ECU 106 outputs the control signal (drive signal) to the seat motor 112 in correspondence to the inputted control signal thereby to drive and control the seat motor 112 to the predetermined position.

Thus, when the authorized user carrying the portable unit 200 approaches the vehicle 100, the seat of the vehicle 100 can be moved. That is, the vehicle 100 can perform the welcome function indicating a welcome operation for the authorized user.

In case that the door mirror light 113 is used as the vehicle device, the checkup ECU 105 turns on and controls the door mirror light 113 in response to the checkup result indicating the checkup OK. More specifically, when the checkup result indicating the checkup OK, the checkup ECU 105 outputs to the chassis ECU 106 a control signal instructing a predetermined lighting condition (for example, lighting condition preferred by the authorized user). When this control signal is inputted, the chassis ECU 106 outputs the control signal to the door mirror light 113 in correspondence to the inputted control signal thereby to turn on and control the door mirror light 113.

Thus, when the authorized user carrying the portable unit 200 approaches the vehicle 100, the door mirror light 113 of the vehicle 100 can be turned on. That is, the vehicle 100 can perform the welcome function indicating a welcome operation for the authorized user.

In case that the air-conditioner ECU 114 is used as the vehicle device, the checkup ECU 105 operates the air-conditioner ECU 114 in response to the checkup result indicating the checkup OK. More specifically, when the checkup result indicating the checkup OK, the checkup ECU 105 outputs to the chassis ECU 106 a control signal instructing a predetermined air-conditioning state (for example, air-conditioning state preferred by the authorized user). When this control signal is inputted, the chassis ECU 106 outputs the control signal to the air-conditioner ECU 114 in correspondence to the inputted control signal thereby to drive and control the air-conditioner ECU 114 for the predetermined air-conditioning state.

Thus, when the authorized user carrying the portable unit 200 approaches the vehicle 100, the air-conditioner ECU 114 (air-conditioner) can be operated. That is, the vehicle 100 can perform the welcome function indicating a welcome operation for the authorized user.

Thus, upon reception of the ACK (response signal), the vehicle-side unit transmits the CHLG (request signal) at every predetermined transmission interval specific to the vehicle-side unit. Upon reception of the WAKE (request signal), the portable unit 200 becomes operative for signal reception at the transmission timing of the request signal transmitted at the transmission interval specific to the vehicle-side unit. The portable unit 200 therefore can receive only the CHLG (request signal) transmitted from the vehicle-side unit of the subject vehicle. As a result, even in a case that the portable unit 200 is present in an area, at which the detection areas of the vehicle-side units mounted on the plural vehicles (vehicles 100A to 100D) overlap, reception of the CHLG (request signal) transmitted from the vehicle-side unit of the other vehicles (vehicles 100A to 100C, in this example). That is, even when the WAKE (request signal) transmitted from the vehicle-side unit of the other vehicles is received once, it is possible to reduce reception of the CHLG (request signal) transmitted from the vehicle-side unit of the other vehicles thereafter. Since transmission of the RSP (response signal) in response to the request signal transmitted from the vehicle-side unit of the other vehicle, battery power consumption can be suppressed.

Further, even in a case that the portable unit 200 is present in the area, at which the detection areas of the vehicle-side units mounted on the plural vehicles (vehicles 100A to 100D) overlap, it is possible to reduce delay in detection of the portable unit 200.

An operation of a vehicle device control system according to a comparative example is shown in a time chart of FIG. 4. In this time chart, it is assumed that, as shown in FIG. 3, plural vehicles (for example, four vehicles) having the vehicle device control systems according to the comparative examples are parked side by side and the portable unit 200 is present in the area, at which the detection areas overlap.

The vehicle device control system according to the comparative example is configured to counter a problem that the vehicle device cannot be controlled because the portable unit 200 erroneously performs the bilateral communication with the vehicle-side units of the other vehicles and cannot communicate with the subject vehicle. A processing operation of this vehicle device control system stops for a predetermined fixed interval the request signal of the vehicle-side unit, which is interfering the operation of the portable unit 200, when the portable unit 200 is receiving interference by the request signal (interference by a radiated radio wave) transmitted from the vehicle-side unit of the other vehicle is giving to the portable unit 200.

For example, in case that the portable unit 200 for the vehicle 100D has started the bilateral communication with the vehicle-side unit of the other vehicle 100A at timing t1 as shown in FIG. 4, this vehicle-side unit stops radiation of a radio wave (transmission of a request signal) for the predetermined interval when the checkup becomes unsuccessful a fixed number of times (for example, three times). At this moment, the bilateral communication between the portable unit 200 and the vehicle-side unit of the other vehicle 100A is prevented for the predetermined interval.

When the portable unit 200 for the vehicle 100D has started the bilateral communication with the vehicle-side unit of the other vehicle 100B at timing t2 as shown in FIG. 4, this vehicle-side unit stops radiation of a radio wave (transmission of a request signal) for a predetermined interval when the checkup becomes unsuccessful a fixed number of times (for example, three times). At this moment, the bilateral communication between the portable unit 200 and the vehicle-side unit of the other vehicle 100A is prevented for the predetermined interval. Depending on the intervals of stopping the transmission of the request signals, it is possible to prevent the bilateral communication between the portable unit 200 and the vehicle-side units of the vehicle 100A and 100B for a predetermined fixed interval.

When the portable unit 200 for the vehicle 100D has started the bilateral communication with the vehicle-side unit of the other vehicle 100C at timing t3 as shown in FIG. 4, this vehicle-side unit stops radiation of a radio wave (transmission of a request signal) for a predetermined interval when the checkup becomes unsuccessful a fixed number of times (for example, three times). At this moment, the bilateral communication between the portable unit 200 and the vehicle-side unit of the other vehicle 100A is prevented for the predetermined interval. Depending on the intervals of stopping the transmission of the request signals, it is possible to prevent the bilateral communication between the portable unit 200 and the vehicle-side units of the vehicle 100A, 100B and 100C for a predetermined fixed interval.

In case that the transmission of the request signals of the vehicle-side units of the vehicles 100A, 100B and 100C are stopped at time t4 as shown in FIG. 4, the portable unit 200 for the vehicle 100D becomes capable of performing the bilateral communication with each other. As described above, detection of the portable unit 200 is delayed from time t1 to time t4.

In the comparative example, if the reachable distance of the request signal of the outside transmitter circuit 101 is about 1 meter, only the detection areas of the vehicle-side units of two vehicles parking side by side overlap. In this case, the delay in detection of the portable unit 200 is not remarkable, even if the portable unit 200 is present in the area, at which the detection areas of the vehicle-side units of the two vehicles parked adjacently.

However, the delay in detection of the portable unit 200 will possibly become remarkable, in case the portable unit is present in the area, at which the detection areas of the vehicle-side units of four vehicles (that is, three or more vehicles) overlap as shown in FIG. 3.

According to the vehicle device control system according to the present embodiment, however, the portable unit 200 can reduce reception of the CHLG (request signal) transmitted from the vehicle-side unit mounted on the other vehicle even when it received once the WAKE (request signal) transmitted from the vehicle-side unit of the other vehicle. Therefore, even when the portable unit 200 is present in the area, at which the detection areas of the vehicle-side units of the plural vehicles (for example, vehicles 100A to 100D), delay in detecting the portable unit 200 can be reduced.

According to the present embodiment, two request signals WAKE and CHLG as well as two response signals ACK and RSP, which correspond to the request signals (transmitted in response to the respective request signals) are referred to. However, it is possible to use three or more request signals and three or more response signals corresponding to the respective request signals. For example, the vehicle-side unit may use, as request signals, a vehicle code and a key code in addition to the WAKE and the CHLG. In this example, the portable unit 200 transmits the ACK in response to the WAKE and transmits the ACK when the received vehicle code agrees with a vehicle code stored in the memory circuit 240 of the portable unit 200. Further, when the received key code agrees with a key code stored in the memory circuit 240 of the portable unit 200, the portable unit 200 transmits the ACK and transmits the CHLG in response to the ACK.

What is claimed is:
1. A vehicle device control system comprising:
a portable unit carried by a user; and
a vehicle-side unit mounted in a vehicle for performing bilateral communications with the portable unit,
in each of the bilateral communications, the vehicle-side unit transmitting a first request signal in a predetermined area around the vehicle and the portable unit transmitting a first response signal in response to the first request signal of the vehicle-side unit, the vehicle-side unit transmitting a second request signal after a predetermined transmission interval specific to the vehicle-side unit and the portable unit transmitting a second response signal in response to the second request signal of the vehicle-side unit;
the vehicle-side unit checking an identification code included in the second response signal received from the portable unit with a pre-stored registration code, and
the vehicle-side unit controlling a vehicle device mounted in the vehicle on condition that a checkup result indicates a successful checkup operation,
wherein the vehicle-side unit includes:
a vehicle-side transmission section for transmitting the first and second request signals to the portable unit;
a vehicle-side reception section for receiving the first and second response signals from the portable unit; and
a vehicle-side control section for instructing the vehicle-side transmission section to transmit the second request signal at the predetermined transmission interval specific to the vehicle side unit, when the first response signal is received from the portable unit by the vehicle-side reception section, and
wherein the portable unit is operable with power supply from a battery, and includes:
a portable-side reception section for receiving the first and second request signals from the vehicle-side unit;
a portable-side transmission section for transmitting the first and second response signals to the vehicle-side unit;
a portable-side memory section for storing the transmission interval of the vehicle-side unit; and
a portable-side control section for instructing the portable-side transmission section to transmit the first response signal when the first request signal is received by the portable-side reception section, to not allow reception of the second request signal after transmitting the first response signal and to take the reception state after a specified period of time in correspondence to the transmission interval stored in the portable-side memory section; wherein
the vehicle-side unit includes
an operation detection section for detecting a predetermined operation on the vehicle by the user;
an operation time acquisition section for acquiring an operation time, at which the predetermined operation on the vehicle is detected by the operation detection section; and
a setting section for setting the transmission interval in correspondence to the operation time acquired by the operation time acquisition section and transmitting a set transmission interval to the portable unit, the set transmission interval being stored in the portable-side memory section as the transmission interval.

2. The vehicle device control system according to claim 1, wherein:
- the vehicle-side transmission section transmits an activation request signal as the first request signal, which requests activation of the portable unit, at every predetermined interval;
- the portable-side control section is in a sleep state, which is a low power consumption mode, while waiting for the activation request signal from the vehicle-side transmission unit, changes to an active state when the activation request signal is received by the portable-side control section, instructs the portable-side transmission section to transmit an activation response signal indicating activation as the first response signal, and instructs the portable-side reception section to take the reception state at a timing of transmission of the second request signal;
- the vehicle-side control section instructs the vehicle-side transmission section to transmit an identification code request signal as the second request signal requesting transmission of a second response signal including the identification code at every predetermined transmission interval specific to the vehicle-side unit, when the activation response signal is received by the vehicle-side reception section; and
- the portable-side transmission section transmits the second response signal including the identification code to the vehicle-side unit in response to the identification code request signal received by the portable-side reception section at a timing of transmission of the identification request signal.

3. The vehicle device control system according to claim 2, wherein:
- the vehicle-side unit includes a vehicle door lock control section for controlling a vehicle door lock section, which locks and unlocks the vehicle door, as the vehicle device; and
- the vehicle door lock control section checks up the identification code included in the second response signal received by the vehicle-side reception section with the pre-stored registration code, and controls the door lock section to perform an unlock operation on condition that the checkup result indicates the successful checkup operation.

4. The vehicle device control system according to claim 1, wherein:
- the vehicle-side unit includes a vehicle door lock control section for controlling a vehicle door lock section, which locks and unlocks the vehicle door, as the vehicle device; and
- the vehicle door lock control section checks up the identification code included in the second response signal received by the vehicle-side reception section with the pre-stored registration code, and controls the door lock section to perform an unlock operation on condition that the checkup result indicates the successful checkup operation.

5. The vehicle device control system according to claim 1, wherein:
- the setting section sets the transmission interval in correspondence to the operation time acquired by the operation time acquisition section and information specific to the vehicle mounted with the vehicle-side unit.

6. The vehicle device control system according to claim 1, wherein:
- the vehicle-side unit includes
  - an exiting detection section for detecting an exiting of the user from the vehicle as the operation detection section; and
  - exiting time acquisition section for acquiring an exiting time, at which the exiting of the user from the vehicle is detected by the exiting detection section, as the operation time acquisition section,
- the setting section setting the transmission interval in correspondence to the exiting time acquired by the exiting time acquisition section, and transmitting a set transmission interval to the portable unit.

7. The vehicle device control system according to claim 1, wherein:
- the vehicle-side unit includes
  - a boarding detection section for detecting boarding of the vehicle into the vehicle as the operation detection section; and
  - a boarding time acquisition section for acquiring a boarding time, at which the boarding of the user into the vehicle is detected by the boarding detection section, as the operation time detection section;
- the setting section setting the transmission interval in correspondence to the boarding time acquired by the boarding time acquisition section, and transmitting a set transmission interval to the portable unit.

8. The vehicle device control system according to claim 1, wherein:
- the vehicle-side unit includes
  - a manipulation detection section for detecting a manipulation of the user on the vehicle device mounted on the vehicle as the operation detection section; and
  - a manipulation time acquisition section for acquiring a manipulation time, at which the manipulation of the user on the vehicle device is detected by the manipulation detection section, as the manipulation time detection section,
- the setting section setting the transmission interval in correspondence to the manipulation time acquired by the manipulation time acquisition section, and transmitting a set transmission interval to the portable unit.

9. The vehicle device control system according to claim 1, wherein:
- the transmission interval is preset in accordance with information specific to the vehicle, in which the vehicle-side unit is mounted, and stored in the portable-side memory section.

10. The vehicle device control system according to claim 1, wherein when the portable-side control section does not allow reception of the second request signal:
- a) the portable unit is unable to receive any request signals; and
- b) the portable unit remains in a power save mode until the timing of the next transmission of the first request signal.

11. A vehicle device control system comprising:
- a portable unit carried by a user; and
- a vehicle-side unit mounted in a vehicle for performing bilateral communications with the portable unit,
- in each of the bilateral communications, the vehicle-side unit transmitting a first request signal in a predetermined area around the vehicle and the portable unit transmitting a first response signal in response to the first request signal of the vehicle-side unit, the vehicle-side unit transmitting a second request signal after a predetermined transmission interval specific to the vehicle-side unit and the portable unit transmitting a second response signal in response to the second request signal of the vehicle-side unit;

the vehicle-side unit checking an identification code included in the second response signal received from the portable unit with a pre-stored registration code, and the vehicle-side unit controlling a vehicle device mounted in the vehicle on condition that a checkup result indicates a successful checkup operation, wherein the vehicle-side unit includes:

a vehicle-side transmission section for transmitting the first and second request signals to the portable unit;

a vehicle-side reception section for receiving the first and second response signals from the portable unit; and a vehicle-side control section for instructing the vehicle-side transmission section to transmit the second request signal at the predetermined transmission interval specific to the vehicle side unit, when the first response signal is received from the portable unit by the vehicle-side reception section, and wherein the portable unit is operable with power supplied from a battery, and includes:

a portable-side reception section for receiving the first and second request signals from the vehicle-side unit;

a portable-side transmission section for transmitting the first and second response signals to the vehicle-side unit;

a portable-side memory section for storing the transmission interval of the vehicle-side unit; and a portable-side control section for instructing the portable-side transmission section to transmit the first response signal when the first request signal is received by the portable-side reception section, to not allow reception of the second request signal after transmitting the first response signal and to take the reception state after a specified period of time in correspondence to the transmission interval stored in the portable-side memory section; wherein the predetermined transmission interval is different for each vehicle of a plurality of vehicles.

* * * * *